United States Patent [19]

Albert et al.

[11] Patent Number: 5,334,901
[45] Date of Patent: Aug. 2, 1994

[54] VIBRATING BEAM ACCELEROMETER

[75] Inventors: William C. Albert, Boonton; Herbert T. Califano, Bloomingdale, both of N.J.

[73] Assignee: AlliedSignal Inc., Morris Township, Morris County, N.J.

[21] Appl. No.: 55,132

[22] Filed: Apr. 30, 1993

[51] Int. Cl.⁵ .............. G01P 15/10; H01L 41/08
[52] U.S. Cl. .................. 310/321; 310/329; 73/517 AV
[58] Field of Search ............ 310/321, 329; 73/517 AV, 517 R

[56] References Cited

U.S. PATENT DOCUMENTS

| | | | |
|---|---|---|---|
| 4,333,342 | 6/1982 | Gilden et al. | 310/329 |
| 4,656,383 | 4/1987 | Albert | 310/321 |
| 4,804,875 | 2/1989 | Albert | 310/321 |
| 4,879,914 | 11/1989 | Norling | 73/517 AV |
| 4,939,935 | 7/1990 | Amand | 73/517 AV |
| 4,980,598 | 12/1990 | Albert | 310/321 |
| 5,092,172 | 3/1992 | Overman | 73/517 AV |
| 5,176,031 | 1/1993 | Peters | 73/517 AV |

FOREIGN PATENT DOCUMENTS

| | | | |
|---|---|---|---|
| 12074869 | 3/1990 | Japan | 73/517 R |
| 9113364 | 9/1991 | PCT Int'l Appl. | 310/329 |

Primary Examiner—Thomas M. Dougherty
Attorney, Agent, or Firm—Donald B. Paschburg; Howard G. Massung

[57] ABSTRACT

A vibrating beam accelerometer contains an inner structure having a vibrating beam extending between a pair of isolator masses which are connected via isolator beams to a pair of structures, an outer structure having flexure beams extending between a mount structure and a proof mass structure and a peripheral seal structure surrounding said inner structure and said outer structure. Seal plates containing a ring of glass frit material sandwich the above assembly. An electrode pattern termination extends from the above assembly, through the ring of glass frit material, to electronic circuitry containing an oscillator.

13 Claims, 4 Drawing Sheets

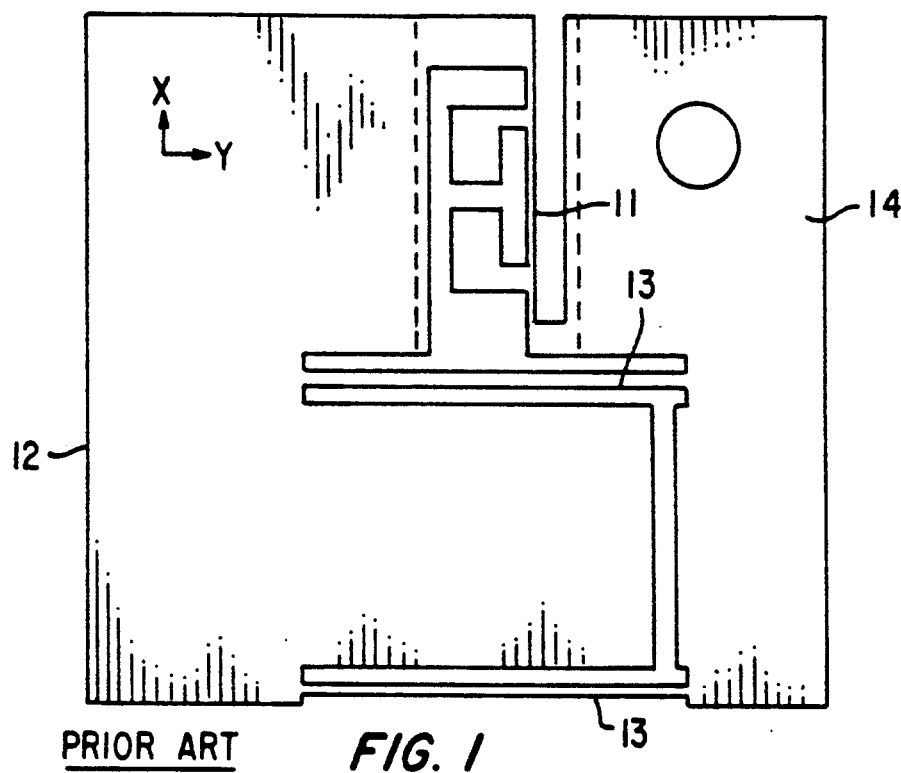
PRIOR ART  FIG. 1
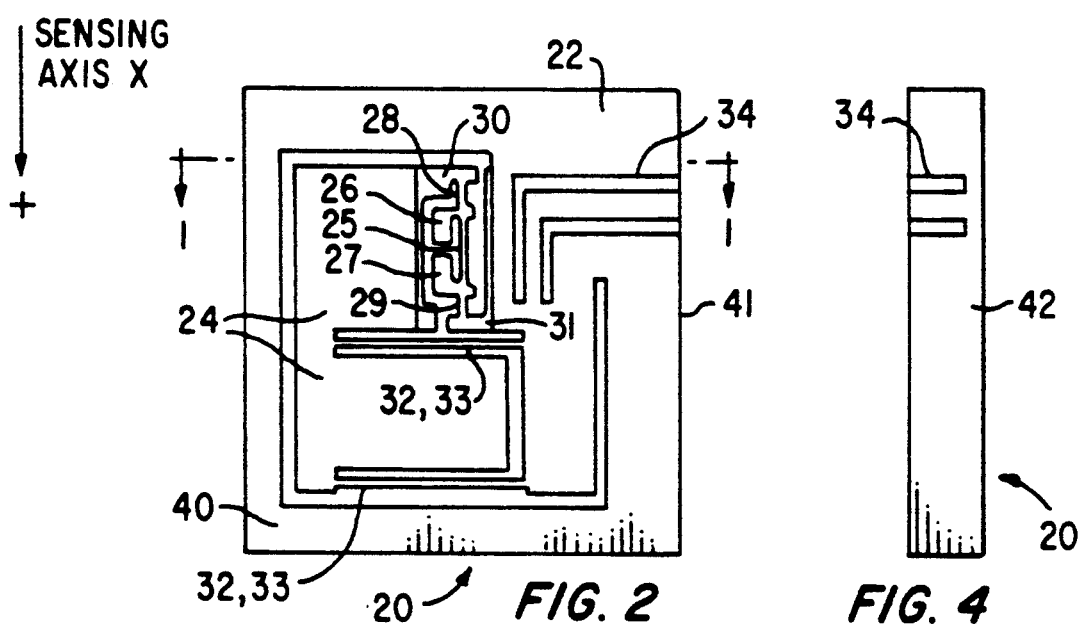 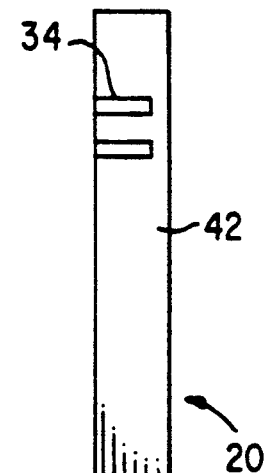
FIG. 2   FIG. 4
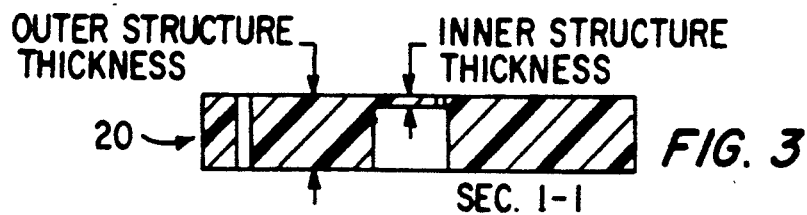
FIG. 3
SEC. 1-1

VIBRATING BEAM ACCELEROMETER

BACKGROUND OF THE INVENTION

1. Field of the Invention

The present invention relates to accelerometers, and more particularly to the construction, sealing and packaging of monolithic vibrating beam accelerometers.

2. Description of the Prior Art

The prior art structure for a monolithic vibrating beam accelerometer (VBA) is illustrated in FIG. 1 as well as in FIG. 6 of U.S. Pat. No. 5,109,175 which issued to the same inventor as the inventor of the present invention. This figure describes a structure in which the vibrating beach sensing element 11, the accelerometer proof mass 12, the proof mass suspension system 13, and the structure mounting means 14 are all made from a single piece of quartz crystal. A key feature of this structure is that it is threedimensional whereby the inner sensing structure portion is of a much thinner section than the outer proof mass, suspension and mounting structure. As explained in U.S. Pat. No. 5,109,175, employing this three-dimension design allows the inner structure sensing requirements to be compatible with the outer structure mass, stiffness and strength requirements. This prior art design, however, lacks the improvement of an additional seal structure to the accelerometer.

Another prior art document, "A Reduced Hysteresis, Extended Range Quartz pressure Transducer", Ward, R. W. and EerNisse, E.P., IEEE 41st Annual Symposium on Frequency Control, May 27–29, 1987, describes a quartz pressure transducer which consists of a cylindrical center section and cylindrical end caps. Two key features of this transducer that will be used in the accelerometer design of the present invention are: (1) The end caps are secured to the center cylindrical section using a glass frit material. This frit is a low melting temperature glass-like material that accomplishes a vacuum-tight seal. (2) The center cylindrical section contains a resonating center section for which the resonance is maintained by the piezoelectric action of the quartz material and metal electrodes plated on the resonator. A key feature of the transducer design is that electrical communication to the internal electrodes is accomplished by a metallic conductive path which extends from the external surface of the device through the glass frit seal to the resonator. This feature of passing a conductive path through a seal joint will also be used in the present invention.

The monolithic quartz accelerometer structure of the prior art, however, is mounted into a machined metal housing that is, in turn, sealed by welding or soldering. The disadvantages of this method of construction are as follows: (1) The machined housing package is expensive. (2) Electrical communication from outside the package to the crystal is accomplished by electrical feed-throughs that must be glassed into the package at added expense. (3) Because the housing is metal, there is an expansion coefficient mismatch between the housing material and the quartz acceleration sensing structure. (4) A means to evacuate the housing must be provided which usually consists of an exhaust tube that is pinch-sealed. This also adds additional expense.

SUMMARY OF THE INVENTION

The vibrating beam accelerometer of the present invention comprises an inner structure and an outer structure which is surrounded by a peripheral seal structure. The inner structure comprises the vibrating beam, isolator masses, isolator beams and structures. The outer structure comprises a mount structure, proof mass structure and flexure beams. An electrode pattern termination extends to and around the edge of the mount structure to facilitate connection to the associated circuit board.

The basic sensing structure of above is expanded into a sealed accelerometer by sandwiching the sensing structure between two quartz crystal seal plates. Sealing is accomplished by a ring of glass frit material. Electrical communication is accomplished because the electrode pattern termination passes through the glass frit seal layer.

BRIEF DESCRIPTION OF THE DRAWINGS

FIG. 1 illustrates a front view of one embodiment of a monolithic resonator for a vibrating beam accelerometer of the prior art.

FIG. 2 illustrates a front view of a monolithic resonator for a vibrating beam accelerometer of the present invention.

FIG. 3 illustrates a top view of a monolithic resonator for a vibrating beam accelerometer of the present invention.

FIG. 4 illustrates a side view of a monolithic resonator for a vibrating beam accelerometer of the present invention.

DETAILED DESCRIPTION OF THE INVENTION

Figure 5:
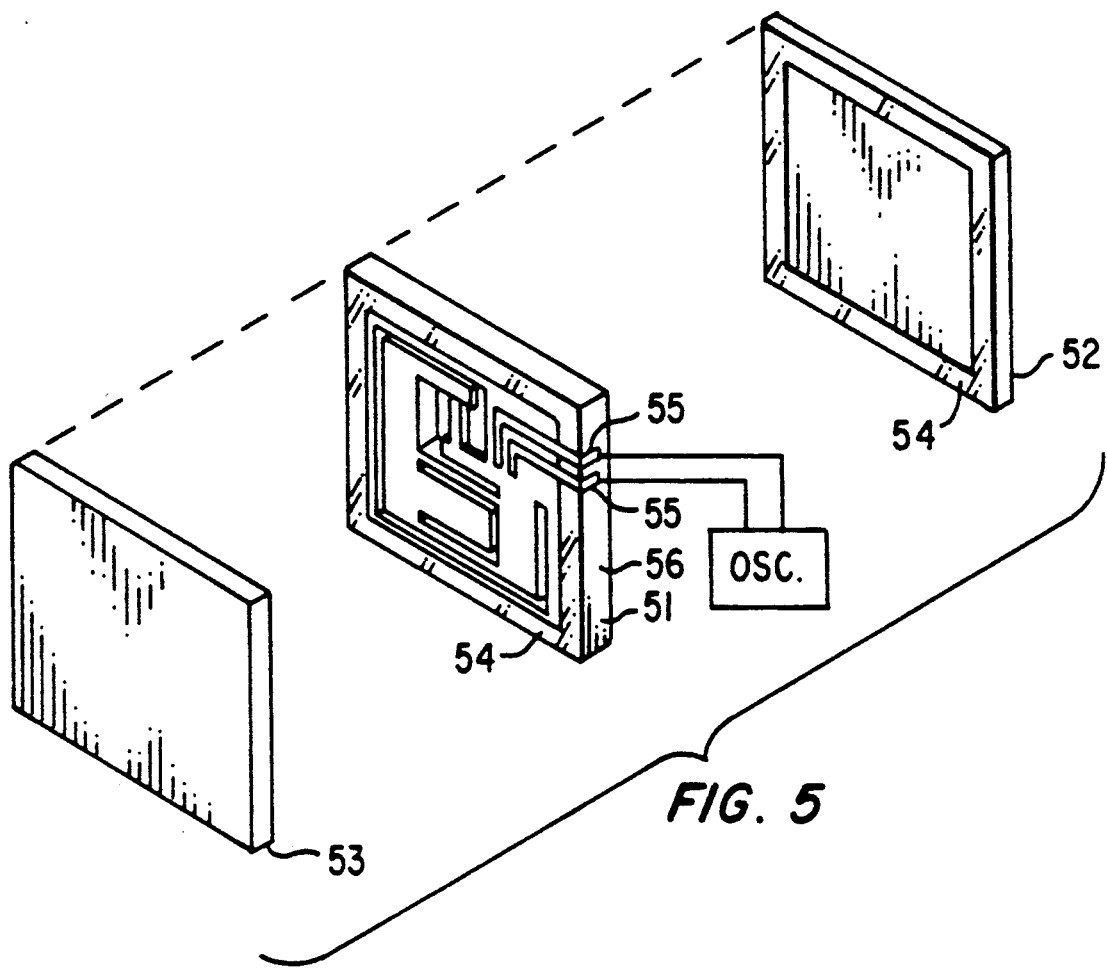
FIGS. 5 and 6 illustrate assembly of a single beam vibrating beam accelerometer of the present invention.

The present invention will be described in terms of a monolithic quartz resonator structure as illustrated in FIGS. 2–4. The resonator 20 includes mount structure 22 and proof mass structure 24. Vibrating beam 25 extends between a pair of isolator masses 26, 27 which, in turn, are connected via isolator beams 28, 29, respectively, to structures 30, 31. Flexure beams 32, 33 extend horizontally between mount structure 22 and proof mass structure 24. An electrode pattern termination 34 is provided which connects to a conventional oscillator circuit (not shown).

As in the prior art, the inner structure including vibrating beam 25, isolator masses 26, 27, isolator beams 28, 29 and structures 30, 31 are significantly thinner in the Z-axis direction than the outer structure including mount structure 22, proof mass structure 24 and flexure beams 32, 33.

Upon sensing acceleration along the sensing axis X, proof mass structure 24 tries to deflect relative to mount structure 22 in the X direction as would be permitted by the compliant flexure beams 32, 33. However, this relative deflection is restrained by the axially stiff vibrating beam 25 so that the vibrating beam will experience either tension or compression depending on the sense of the input acceleration. Since the vibration frequency of the vibrating beam 25 is sensitive to axial force, this frequency will change in proportion to the magnitude and direction of the input acceleration. The frequency change from a known zero load bias frequency is therefore a measure of input acceleration.

As discussed earlier, the inner portion of the structure is similar to the prior art structure of FIG. 1. One new feature of the new design of the present invention is the addition of peripheral seal structure 40 which surrounds proof mass structure 24 and mount structure 22 as shown in FIGS. 2–4. Another new feature is the extension of electrode pattern termination 34 to edge 41 of the structure and then around edge 41 to end surface 42 as is also shown in FIG. 4.

Figure 6:
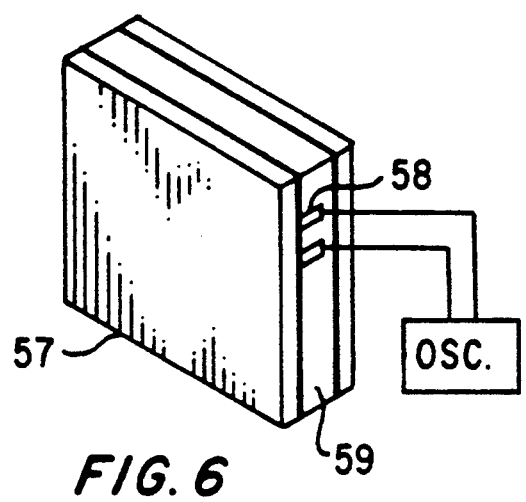

The following will describe how the basic sensing structure of FIGS. 2–4 is expanded into a sealed accelerometer structure as shown in FIGS. 5 and 6. First, sensing structure 51 is sandwiched between two quartz crystal seal plates 52, 53. Sealing is accomplished by a ring of glass frit material 54 as shown. Electrical communication to the internal sensing element is accomplished by having conductive electrode pattern termination 55 pass through glass frit seal layer 54 to one of the side surfaces 56 as also shown. The assembly shown in FIGS. 5 and 6 is intended to be assembled within a vacuum or other rarified gas environment. Assembly fixturing will keep the individual layers apart while the surrounding atmosphere is evacuated and heated. When the desired temperature and bake-out time is achieved, the assembly fixturing will bring the parts together so that the molten glass frit material forms the seal. Controlling the thickness of glass frit seal layer 54 establishes the desired gap between the assembly layers. Upon cooling the evacuated and sealed assembly 57 is removed from the assembly oven for further processing. Note that electrical communication to the internal portion of the sensing structure is achieved by electrode termination areas 58 on the side 59 of the assembly as shown in FIG. 6.

Figure 7:
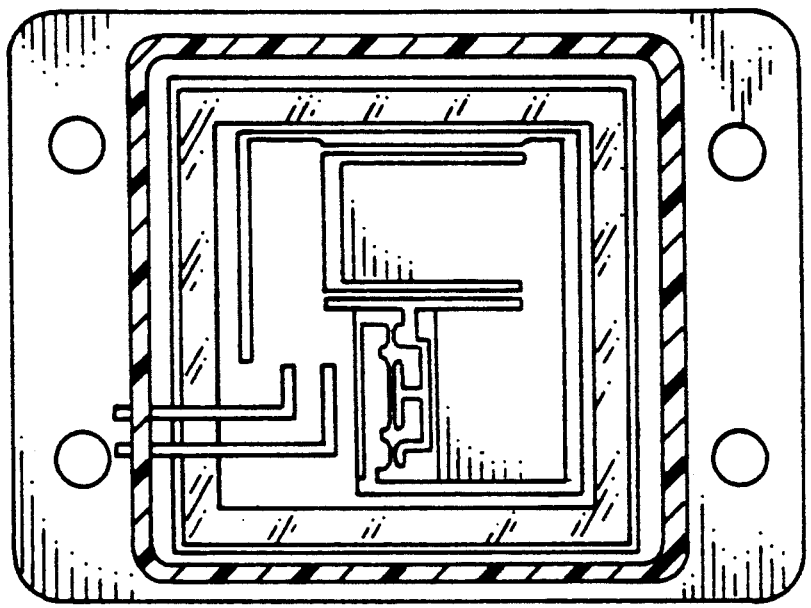
FIG. 7 illustrates a top view of the vibrating beam accelerometer assembly including the electronic oscillator circuit.
Figure 8:
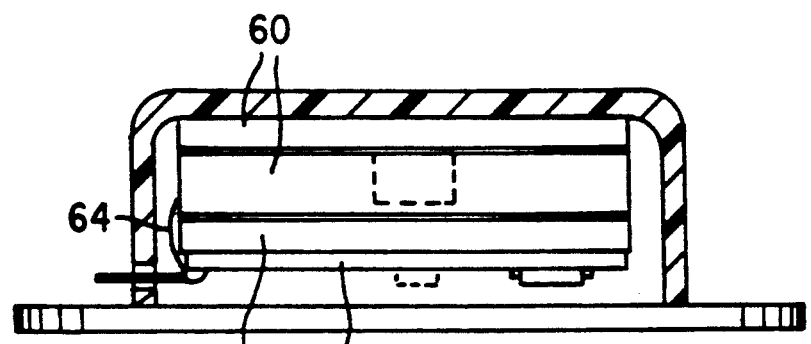
FIG. 8 illustrates a side view of the vibrating beam accelerometer assembly including the electronic oscillator circuit.

At the next level of assembly, the sealed sensor assembly 60 will be assembled along with circuit board 62 containing the electronic oscillator circuit (not shown) as shown in FIGS. 7 and 8. Please note lead 64 connecting sealed sensor assembly 60 with circuit board 62. In another embodiment, the electronic circuitry could be contained within the sealed sensor assembly. Because this outer packaging arrangement requires no special sealing or bake-out requirements, low-cost formed or stamped parts may be used. While FIGS. 7 and 8 suggest one form of final packaging, it is obvious to those skilled in the art that any other low-cost final packaging arrangements can also be used.

The foregoing description is the presently preferred design. However, there are alternate methods of construction that also apply to the present invention.

Figure 9:
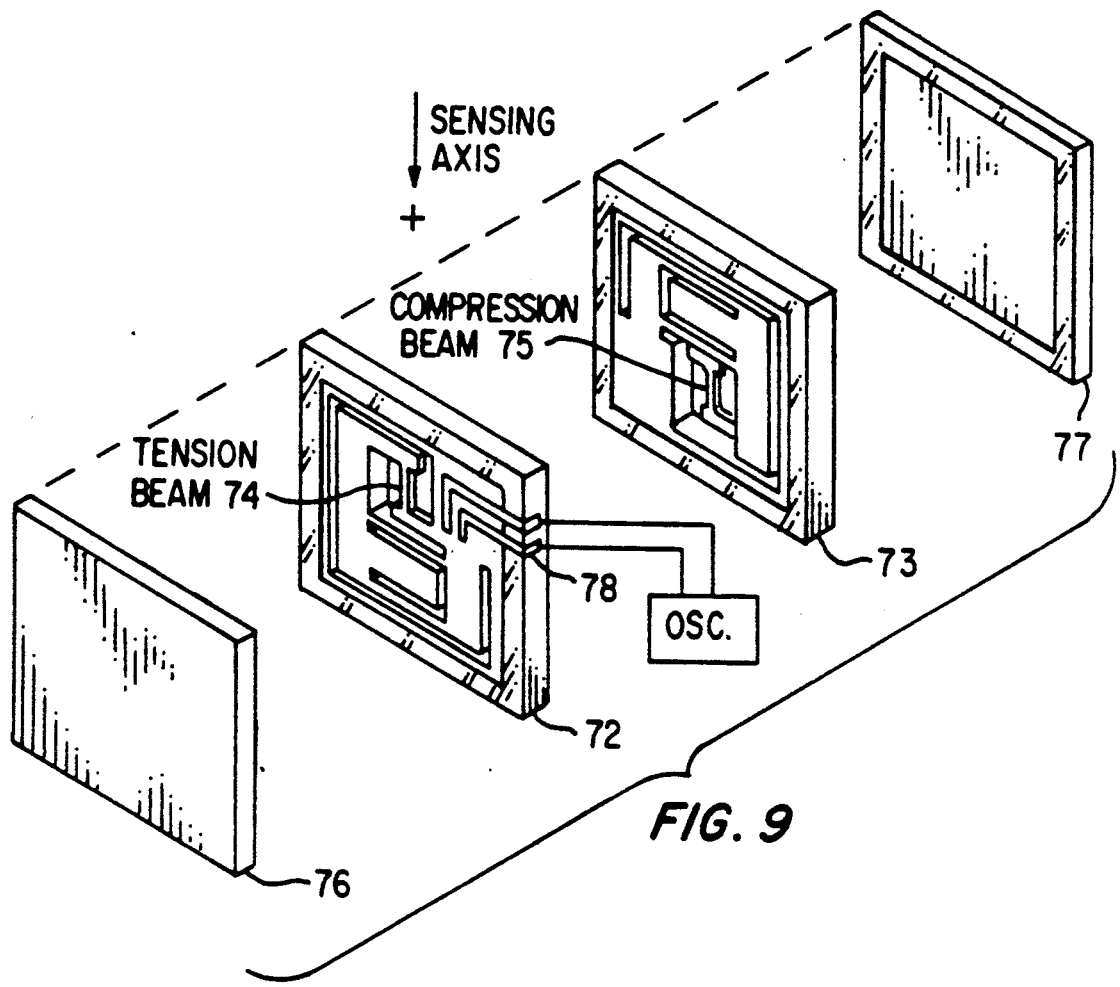
FIGS. 9 and 10 illustrate assembly of a dual-beam vibrating beam accelerometer of the present invention.
Figure 10:
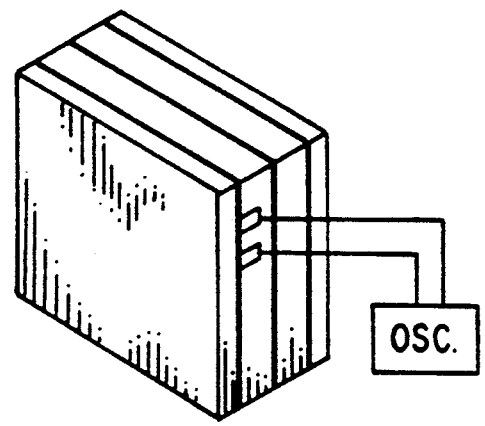

As an example, for many vibrating beam accelerometer applications, two separate sensor structures are used that each have their own vibrating beam sensing element. FIGS. 9 and 10 illustrate assembly of a dual beam vibrating beam accelerometer that utilizes the present invention. These separate (schematically shown) sensor structures 72, 73 are arranged so that the input acceleration to be measured places one beam 74 in tension and the other beam 75 in compression. The output signal of the complete VBA is taken as the difference frequency of the two individual VBAs. This dual-beam (push-pull) operation has the advantage of rejecting many con, non mode error sources such as non-linearity and temperature sensitivity. This dual-beam, push-pull mechanization is a well known method of improving the performance of vibrating beam accelerometers. FIGS. 9 and 10 illustrate this alternate design which contains two sensing elements 72, 73 arranged in a push-pull configuration. With the exception of the additional sensing sandwich layer, glass frit seal layer 54, quartz crystal seal plates 76, 77 and electrical feed-through arrangements 78 are identical to the primary design.

Improvements of the invention over the prior art include the following: (1) The addition of the seal structure to the prior art structure provides for a construction and sealing method which results in an assembly without dissimiliar materials. By using quartz crystal for both the sensing portion and end-seal plates, there are no dissimilar materials and, therefore, no thermal expansion mismatch problems. (2) Having the conductive paths pass through the glass frit seal eliminates the need for separate electrical feed-throughs and any sealing and assembly problems and costs they may bring. (3) Since the evacuation, bake out and sealing are all done within one oven operation, the need for a separate evacuation means such as an exhaust pinch tube is eliminated along with its assembly, sealing problems and costs. (4) The sealed assembly can be packaged in a low-cost outer package that is fabricated from low-cost stamped and formed components. Such a low-cost external package does not have the machining, sealing and evacuation means of the packages required for the prior art accelerometer.

The preferred material to make the monolithic sensing elements and the end plates is quartz crystal. Quartz crystal is somewhat unique for this application since it is a very stable material and it is also piezoelectric which provides a means for sustaining the vibrating beam oscillations. However, other materials such as fused quartz, silicon, or ceramic materials (be they piezoelectric or not) may also be used.

The preferred method of sealing is a glass frit. However, a seal made from an easily deformable metal such as indium is also possible. If such a metal seal is used, an alternate means of electrical feed-through must be used or a ceramic insulating layer must be placed over the sealed area through which the electrode termination passes.

Another alternate seal material which, like the glass frit, is an insulator can also be used. Such a sealant material could be an epoxy or another organicbased sealant material.

It is not intended that this invention be limited to the hardware or software arrangement, or operational procedures shown disclosed. This invention includes all of the alterations and variations thereto as encompassed within the scope of the claims as follows.

We claim:

1. A vibrating beam accelerometer comprising:
   an inner structure comprising a vibrating beam extending between a pair of isolator masses which are each connected via isolator beams to a pair of structures;
   an outer structure comprising flexure beams extending between a mount structure and a proof mass structure;
   a peripheral seal structure mounted to said mount structure and surrounding said inner structure and said outer structure;

an electrode pattern termination extending to and around an edge of said mount structure of said outer structure; and electronic circuitry means including an oscillator connected to said electrode pattern termination.

2. An accelerometer as claimed in claim 1 further comprising:

a plurality of seal plates sandwiching said inner structure, said outer structure and said peripheral seal structure while allowing said electrode pattern termination to pass through.

3. An accelerometer as claimed in claim 2, wherein each of said plurality of seal plates comprises quartz crystal.

4. An accelerometer as claimed in claim 1 wherein said outer structure has a thickness greater than said inner structure.

5. An accelerometer as claimed in claim 1 wherein said outer structure is about three to about twenty times the thickness of said inner structure.

6. An accelerometer as claimed in claim 1 wherein said mount structure attaches said inner structure, said outer structure and said peripheral seal structure to a housing of said vibrating beam accelerometer.

7. An accelerometer as claimed in claim 1 wherein said peripheral seal structure surrounds said proof mass structure and said mount structure.

8. An accelerometer as claimed in claim 1 wherein said inner structure, said outer structure and said peripheral seal structure comprise quartz crystal.

9. An accelerometer as claimed in claim 2 wherein each of said plurality of seal plates comprises a ring of glass frit for sealing.

10. An accelerometer as claimed in claim 9 wherein said electrode pattern termination passes through said ring of glass frit.

11. An accelerometer comprising:

a plurality of separate sensor structures wherein each of said plurality of separate sensor structures comprises:

an inner structure comprising a vibrating beam extending between a pair of isolator masses which are each connected via isolator beams to a pair of structures;

an outer structure comprising flexure beams extending between a mount structure and a proof mass structure;

a peripheral seal structure mounted to said mount structure and surrounding said inner structure and said outer structure;

an electrode pattern termination extending to and around an edge of said mount structure; and electronic circuitry means including an oscillator connected to said electrode pattern termination.

12. An accelerometer as claimed in claim 11 further comprising:

a plurality of seal plates sandwiching said plurality of separate sensor structures while allowing said electrode pattern termination to pass through.

13. An accelerometer as claimed in claim 12 wherein each of said plurality of seal plates comprises a ring of glass frit for sealing.

* * * * *